United States Patent [19]
Anderson

[11] 3,727,930
[45] Apr. 17, 1973

[54] TAPERED CHUCKING ASSEMBLY

[76] Inventor: Clarence W. Anderson, 7813 W. Carmen, Norridge, Ill.

[22] Filed: Sept. 30, 1971

[21] Appl. No.: 185,294

[52] U.S. Cl. ................279/50, 279/1 F, 279/1 ME, 279/43, 279/57, 279/65
[51] Int. Cl. ............................................B23b 31/10
[58] Field of Search.....................279/50, 57, 37, 34, 279/1 F, 1 E, 1 B, 43, 65, 74, 1 ME

[56] References Cited

UNITED STATES PATENTS 2,545,628    3/1951    O'Connell.............................279/50

FOREIGN PATENTS OR APPLICATIONS 69,477    1952    Netherlands.........................279/50
681,600   1964    Canada................................279/50

*Primary Examiner*—Andrew R. Juhasz
*Assistant Examiner*—Z. R. Bilinsky
*Attorney*—Dominik, Knechtel and Godula

[57]    ABSTRACT

A combination to prevent binding between a tapered seat in a rotatable engaging element and the tapered head of a split, spring collet for holding work stock, said means providing a spiral groove on one of the tapered surfaces, which spiral groove is opposite to the direction of rotation of the engaging element.

10 Claims, 5 Drawing Figures

PATENTED APR 17 1973　　3,727,930

INVENTOR
Clarence W. Anderson
BY
Dominik, Knechtel & Godula
ATTORNEYS

TAPERED CHUCKING ASSEMBLY

This invention relates to an improved chucking assembly, and particularly relates to an improved assembly wherein a rotatable engaging element with a tapered seat contacts the tapered head of a split, spring collet to induce said collet to grip a work stock; said assembly causing the collet to release the work stock when the engaging element is moved out of contact with the tapered head of the collet.

The use of a split collet as a chucking member, is well known in the art, said collet usually having a head with three split sections defining a central passageway for holding a work piece such as a stock bar or the like. Such a split collet has spring action in that the separate sections of the collet resume their original position after a compressing force, which moves the collet into chucking position, is withdrawn. The separated split sections resume their original position by moving away from the axis of this central passage. This allows the work piece to be then withdrawn. The compressing force is generally applied by moving an engaging element with a tapered seat into contact with a tapered portion on the head of the split spring collet. The tapered seat and the tapered head are conventionally continuous curvilinear surfaces adapted to induce simultaneous movement of the split sections of the collet following relative movement between the collet and the tapered seat in the engaging element.

In common usage, the engaging element is either a sleeve member with an internally tapered seat or a spindle member in which the tapered seat is ground on the inside at one end. It is also common usage to rotate said spindle, or said sleeve in a spindle assembly, to induce rotation of the split, spring collet and the work stock held therein. Generally, the sleeve or spindle is rotated in a right hand manner and advanced in a forward direction so that the tapered seat thereof contacts the tapered head of the collet to induce chucking operation or a gripping position of the work stock. It is, however, provided that some embodiments in practice provide for rotating the spindle or sleeve in a left hand manner to move in a rearward direction to perform the same function; that is, to engage the tapered seat with the tapered head to induce the chucking operation or gripping action of the work stock.

Operations of the spindle or sleeve with the spring, split collet are commonly practiced in screw machines, both manual and automatic. Commonly known automatic screw machines are made and supplied by Brown & Sharpe Mfg. Co., Precision Park, North Kingstown, R. I. Various size automatic screw machines are available, and such machines generally have provisions for handling different size collects and sleeves or spindles to accommodate a stock of different size and shape.

One serious problem which arises frequently in operations which use the assembly of the engaging element and the split collet is that of undesirable binding between the contacting tapered surfaces of the seat and head. This arises from the bearing contact between the two tapered surfaces during rotation of the sleeve or spindle. At continued or higher speed rotations, a binding of the respective tapered surfaces does frequently occur as the result of heat generated and wear from the high friction which occurs between the surfaces. Practitioners faced with this problem have been known to attempt crude and imperfect solutions, principally scoring the tapered head of the collet to reduce the likelihood of binding. This has resulted in limited success, and is additionally undesirable because it damages the collet head. This is a particular problem if the scoring by a file or the like is not carefully performed. Shop practitioners are known to score such heads with an X mark even though such practice is disapproved or even forbidden by shop owners.

It is, accordingly, one important object of the present invention to provide a new collet chucking assembly with improved means for substantially preventing the binding between tapered surfaces of a rotatable engaging element in a split collet.

A still yet another important object of the present invention is an improved chucking assembly where preformed means are provided between the contact tapered surfaces to induce an unwinding action following rotation of the sleeve or spindle to thereby prevent binding between such surfaces. It is a feature of this object that such preformed means may be quickly, reliably and economically provided without interfering with the operation of the chucking assembly in any way; and without requiring introduction of additional structures or elements to complicate the operation or to increase the cost.

Still yet another important object of the present invention is to provide an improved chucking assembly of the type described in which improved preformed means between the tapered surfaces can be provided, irrespective of whether the engaging element is rotated in a right handed or left handed manner. It is a feature of this object that the engaging element can be rotated in a right handed manner to be advanced in a forward direction, or in a left handed manner to be advanced in a rearward direction, both directions executed for the purpose of engaging the tapered head of the split collet to effect the chucking operation.

The foregoing objects are now attained with still other objects which will occur to practitioners from time to time by the invention shown in the following disclosure, which includes drawings wherein.

Use of the same numerals in the various views of the drawings will represent a reference to the same structures, elements or features, as the case may be.

Figure 1:
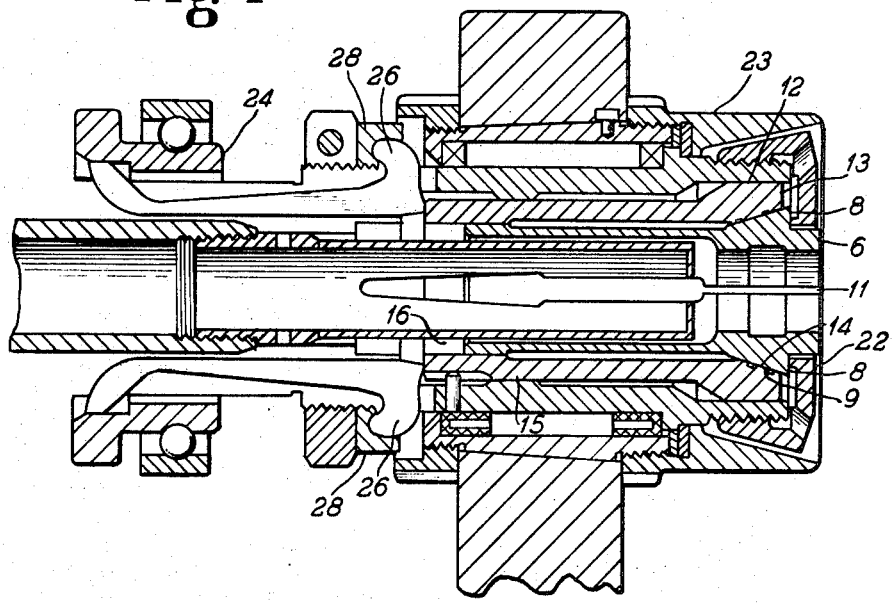
FIG. 1 is a side elevational view, mostly in section, showing a representative environment of a screw machine which incorporates the improved chucking assembly.
Figure 2:
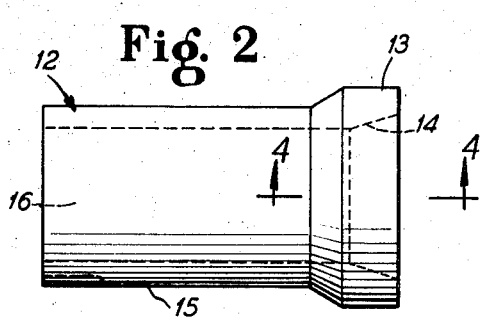
FIG. 2 is a side elevational view of a rotational sleeve provided with the improved preformed means for preventing binding with the split collet head.
Figure 3:
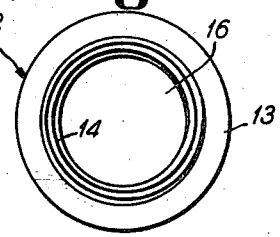
FIG. 3 is an elevational view looking into the front end of the sleeve of FIG. 2.

The collet chucking assembly may be operated in different ways and in various environments, one such representative environment being indicated in the view of FIG. 1. Such a view is of a high speed automatic screw machine of the type supplied by Brown & Sharpe, previously identified. The illustrated section may, for example, be part of a No. 2 Size screw machine.

Figure 5:
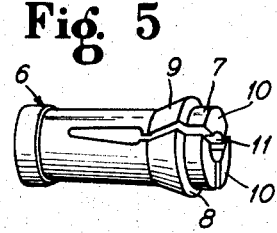
FIG. 5 is a perspective view of a spring, split collet on a reduced scale, used in the improved chucking assembly.
Figure 4:
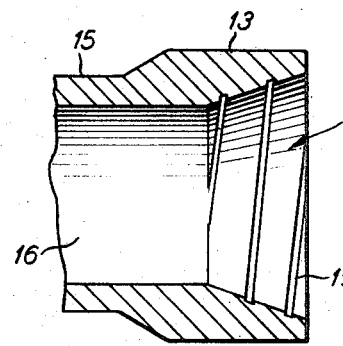
FIG. 4, is a sectional view along line 4—4 of FIG. 2, but on an enlarged scale.

A spring, split collet is indicated generally at 6, and further details of such collet may be seen in the perspective view of FIG. 5, on a reduced scale. A collet head 7 is separated by a shoulder 8 from a head taper 9. The tapered surface on the head is continuous except for three spacings or gaps which separate split collet parts or sections 10. The collet sections or parts define a central passageway 11 which extends throughout the body of the collet. Such collets are well known in the art and will not be described in further or greater detail unless necessary to an understanding of the invention.

In the illustrated embodiment of FIG. 1, the rotatable engaging element is shown as a sleeve 12. A sleeve, for the most part, is formed in the conventional way in that it has an enlarged head 13 with an interior continuous tapered seat or surface 14. The sleeve has a continuous annular wall or body 15 which defines a sleeve passageway 16. The spring, split collet 6 is adapted to be received in passageway 16 of the sleeve, and tapered head 9 of the collet is adapted to be engaged by tapered seat 14 of the sleeve.

The tapered seat of the sleeve is provided with a spiral groove shown generally as 18. The illustrated spiral groove is shown as having three turns, one of which is indicated at 19. The illustrated spiral groove is a left hand groove or helix, such a sleeve being rotatable in a right hand manner while moving forward, or to the right in the view of FIG. 1. It has been found that only a few turns are required in such a spiral groove to effect successful "unwinding action," thereby preventing binding between the tapered surfaces of the sleeve and collet. The illustrated spiral groove or helix is shown with three turns, one turn beginning substantially at the open or enlarged end of the tapered seat, another turn being substantially at the opposite closed or smaller end of the tapered seat, and other turn being intermediate the turns at the opposite ends of the seat. It is further seen that the distance in the tapered seat between the individual turn is several times the thickness of each turn. In practice, it has been found to be a useful and preferred embodiment to have the distance between adjoining turns at least two times the thickness of each individual turn. In practice, and as illustrated, the actual distance between adjacent turns may be 4–5 times the thickness of the individual turn, or even greater.

In operation, an automatic screw machine, such as that illustrated in FIG. 1, provides that the sleeve 12 be moved forward while rotating in a right handed manner. In this way, the tapered surface 14 contacts the tapered head 9 of the collet to induce the split collet sections 10 to move inwardly towards the central axis of the passageway 11. Such sections grip a work stock (not shown) positioned within the passageway. The illustrated embodiment shows a nut 22, having portions bearing against shoulder 8 of the collet head, to thereby prevent end movement or displacement of the collet. The sleeve 12 and collet 6 are rotated by the spindle assembly shown generally at 23.

The sleeve 12 is moved forward or to the right in the view of FIG. 1 by well known means which include movement of slidable sleeve 24 backwards or to the left in the view of FIG. 1. Such movement causes chuck levers 26 to turn on fulcrum elements 28, thereby inducing forward movement of sleeve 12 so that the respective tapered surfaces between the sleeve and the collet make tight, compressing contact. When the slidable sleeve moves forward or to the right in the view of FIG. 1, sleeve 12 is released and the spring action of the collet, together with the tapered relationship of the surfaces, causes the tapered seat 14 to move away or rearwardly from the tapered head 9 of the collet. The left hand spiral groove enhances this separation by imparting the unwinding action which prevents binding during the high rotational speeds attained during operation.

It will be evident that the left handed helix will prevent the binding during actual operation of a right hand rotating sleeve, spindle, or both. It will also be evident from the present disclosure that when the sleeve, for example, is moved rearwardly, the spring action of the split collet sections will aid in separating the sleeve because of the left handed helix between the tapered surfaces. In other words, the left handed helix particularly produces the "unwinding action" at such a time. If the tapered seat is ground directly into the spindle, a left handed helix in the tapered head would serve to spring the collet forward of the spindle in a modified embodiment where there is no restraining nut such as 22.

It will be evident that a right handed spiral groove may be provided between the tapered surfaces where the machine has a backward running spindle, or one turning in a left hand manner. It will also be evident that some embodiments could provide that the spiral groove be provided on the tapered head rather than in the tapered seat of the sleeve, although such an embodiment would not be more desirable because of the gaps between the parts or sections 10 of the collet head. In any event, the spiral groove is opposite to the direction of rotation which is required to move the engaging element forward to contact the split collet head.

The claims of the invention are now presented.

What is claimed is:

1. In the combination of a split, spring collet having a tapered head surface, a rotatable engaging element with a tapered seat surface for contacting said collet tapered head, means to selectively rotate said engaging element, and means to move said engaging element forward and backward to selectively open and close the collet to grip a work stock and to open the collet to release the work stock, the improvement for preventing binding between the tapered surfaces, which comprises
   a spiral groove in one of the tapered surfaces, and said spiral groove being opposite to the direction of rotation required to move the engaging element forward to contact said collet tapered head.

2. The combination with the improvement for preventing binding between the tapered surfaces as in claim 1, wherein said spiral groove is in the tapered seat of said engaging element.

3. The combination with the improvement for preventing binding between the tapered surfaces as in claim 2, wherein the engaging element is a sleeve rotated by a spindle in a screw machine.

4. The combination with the improvement for preventing binding between the tapered surfaces as in claim 2, wherein the engaging element is a spindle in a screw machine, said tapered seat being ground in said spindle end.

5. The combination with the improvement for preventing binding between the tapered surfaces as in claim 2, wherein said engaging element is a sleeve in an automatic screw machine, and said spiral groove is left handed, said means moving the sleeve forward to engage the tapered head of the collet for gripping a work stock, and means to release the contact of said sleeve with the collect head, whereby the spring action of the collet and the left handed spiral groove cooperate to separate contact of the tapered seat in the sleeve with the head of the split collet.

6. The combination with the improvement for preventing binding between the tapered surfaces as in claim 2, wherein said spiral groove is left handed and has turns which are spaced from one another by a distance which is more than two times the width of the spiral groove.

7. The combination with the improvement for preventing binding between the tapered surfaces as in claim 2, wherein said spiral groove is left handed and has about three turns extending throughout said tapered seat.

8. The combination with the improvement for preventing binding between the tapered surfaces as in claim 2, wherein said spiral groove has a turn starting at one end of the tapered seat and a final turn at the opposite end of the tapered seat, and one intermediate turn between said end turns.

9. The combination with improvement for preventing binding between the tapered surfaces as in claim 1, wherein said spiral groove is left handed when the engaging element is rotated in a right hand manner.

10. The combination with improvement for preventing binding between the tapered surfaces as in claim 1, wherein said spiral groove is right handed when the engaging element is rotated in a left hand manner.

* * * * *